(12) United States Patent
Biswas et al.

(10) Patent No.: US 10,521,841 B2
(45) Date of Patent: Dec. 31, 2019

(54) METHOD AND APPARATUS FOR INTEGRATING AN E-COMMERCE PROVIDER WITH THIRD-PARTY VENDORS

(71) Applicant: Adobe Inc., San Jose, CA (US)

(72) Inventors: Sanjeev Kumar Biswas, Bangalore (IN); Daniel Carl Brotsky, Berkeley, CA (US); Shyama Prasad Padhi, Union City, CA (US)

(73) Assignee: Adobe Inc., San Jose, CA (US)

( * ) Notice: Subject to any disclaimer, the term of this patent is extended or adjusted under 35 U.S.C. 154(b) by 1399 days.

(21) Appl. No.: 13/867,636

(22) Filed: Apr. 22, 2013

(65) Prior Publication Data

US 2014/0316943 A1 Oct. 23, 2014

(51) Int. Cl.
*G06Q 30/06* (2012.01)
*G06Q 10/08* (2012.01)

(52) U.S. Cl.
CPC ....... *G06Q 30/0617* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 2003/0154387 A1* | 8/2003 | Evans | G06F 21/10 713/193 |
| 2005/0171858 A1* | 8/2005 | Cotton | G06Q 30/06 705/26.42 |
| 2005/0235282 A1* | 10/2005 | Anderson | G06F 8/65 717/178 |
| 2007/0022007 A1* | 1/2007 | Lawe | G06Q 30/02 705/14.23 |

OTHER PUBLICATIONS

Cronin et al., "Centralized E-Commerce System" IP.com Prior Art Database, Jul. 29, 2009 https://priorart.ip.com/IPCOM/000185645 (Year: 2009).*

* cited by examiner

*Primary Examiner* — Kathleen Palavecino
*Assistant Examiner* — Lance Y Cai
(74) *Attorney, Agent, or Firm* — Keller Jolley Preece

(57) ABSTRACT

A computer implemented method and apparatus for integrating e-commerce providers with third-party vendors. The method comprises receiving an order from one vendor of a plurality of vendors, wherein the order comprises a vendor identification, a fulfillment identification, and a vendor stock keeping unit (SKU), and wherein a plurality of the vendors each has a unique communication protocol; mapping the fulfillment identification to a user identification (userID) known to a provider; mapping the vendor SKU to a provider SKU; generating a provisioning call responsive to the mapping; and provisioning the SKU for the userID in a database of the provider in response to the provisioning call.

20 Claims, 3 Drawing Sheets

METHOD AND APPARATUS FOR INTEGRATING AN E-COMMERCE PROVIDER WITH THIRD-PARTY VENDORS

BACKGROUND OF THE INVENTION

1. Field of the Invention

Embodiments of the present invention generally relate to e-commerce and, more particularly, to a method and apparatus for integrating a provider with third-party vendors.

2. Description of the Related Art

E-commerce providers, such as ADOBE®, often sell their products through third-party vendors, such as ITUNES® or AMAZON®. Each vendor typically has a unique way of selling products through their e-commerce system. For example, AMAZON® uses its own Simple Notification Service (SNS) and Simple Queue Service (SQS) linking based communication protocol. That is, SQS and SNS are messaging services that communicate by sending an email to a user which includes a confirmation link to a specified email address. The user is required to monitor the email address to explicitly "opt-in" to receive an item or service by clicking the provided link. Product details are not included in the communicated message. ITUNES® uses a receipt-based mechanism where an email communication provides a purchase receipt having an Order ID and text description for the transaction details. Also, vendors manage their own stock-keeping units (SKUs) so as to track product inventory. Thus, to properly interpret orders received from a plurality of vendors, a provider's e-commerce system must be integrated with each vendor's system, so as to process and understand each of their specific communication and transaction protocols, as well as to properly manage the vendors' SKUs.

Currently, one or more engineering teams work on integration of the vendor communication and transaction protocols with the e-commerce system of the provider, on a vendor-by-vendor basis. For each vendor, code must be written so that a provisioning call to the provider will properly handle the transaction reporting details, including identity of the purchaser and management of the SKUs and other transaction details. This individual attention results in a significant cost in time and resources to the provider each time the provider wants to integrate with a new vendor or any of the details of an already integrated vendor has a change in their communication or transaction reporting protocol.

Therefore, there is a need for a method and apparatus for seamlessly integrating an e-commerce provider with third-party vendors.

SUMMARY OF THE INVENTION

A method and apparatus for integrating a provider with third-party vendors substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
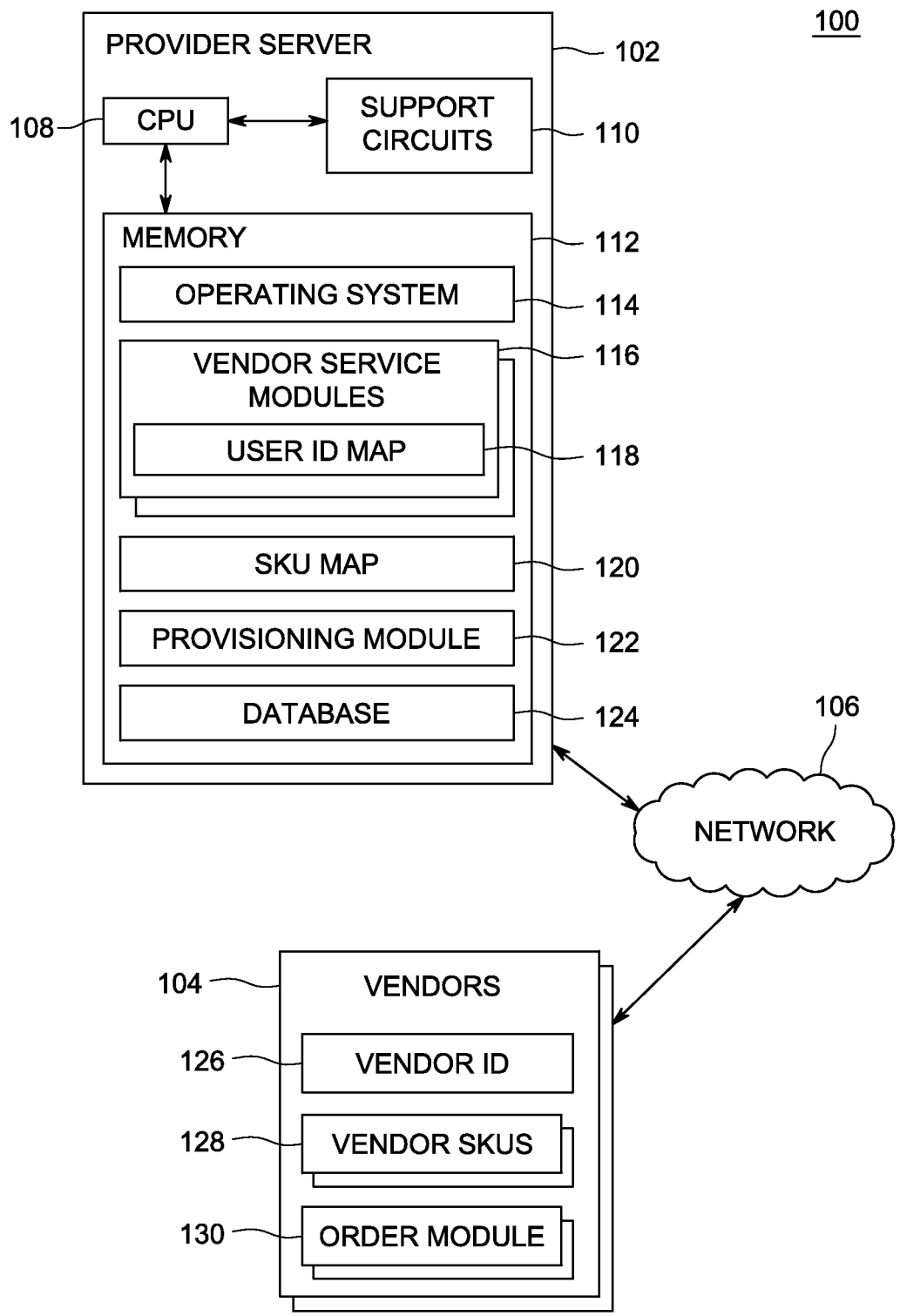
FIG. 1 is a block diagram of a system for seamlessly integrating a provider with third-party vendors, according to one or more embodiments.

While the method and apparatus is described herein by way of example for several embodiments and illustrative drawings, those skilled in the art will recognize that the method and apparatus for seamlessly integrating a provider with third-party vendors is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for seamlessly integrating a provider with third-party vendors defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus that provides an interface for seamlessly integrating a provider with third-party vendors. When a vendor receives an order, whether it is for a software product, for additional storage, or for an extension to a subscription software product (as non-limiting examples of orders to be fulfilled), the vendor only knows its own vendorID, the vendor's SKU for the ordered item, and a fulfillment userID for the user placing the order. The fulfillment userID and vendor SKU are relevant to the vendor, but have no significance to the software provider. Embodiments of the present invention receive an order from a vendor. The order includes the vendorID, the fulfillment userID, and the vendor's SKU for the ordered item. Based on the vendorID, the method provides an order interface that modifies the order from the vendor to match the requirements of the provider. The method maps the fulfillment userID to a userID registered with the provider. The method then maps the vendor's SKU to a provider SKU. The method sends a command (call) to provision the provider SKU in the provider's database for the specified userID. The SKU and userID are validated during the provisioning process and the method returns a response to the vendor regarding the success or failure of the provisioning process.

Advantageously, software providers, such as ADOBE®, may use this architecture to sell its product(s) through multiple vendors. Any number of vendors may be added without a change to how the ordered item is provisioned. Regardless of the architecture or protocol used by a vendor, the method integrates the provider with the vendor such that a provisioning call to the provider is uniform for all. Specifically, whether a user makes a purchase, in which case a subscription may need to be created or whether a user renews a subscription, in which case an existing subscription may need to be extended, the vendor need not be aware of nor concerned with the provisioning. All provisioning is handled by the software provider. Hence, third-party vendor services may be built without modifying SKU management, or subscription management.

Various embodiments of a method and apparatus for seamlessly integrating a provider with third-party vendors are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 (in the form of a system) for seamlessly integrating a provider with third-party vendors, according to one or more embodiments. The apparatus 100 includes a provider server 102 to which a plurality of vendors 104 are communicatively coupled via a network 106. The server 102 includes a Central Processing Unit (CPU) 108, support circuits 110, and memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a plurality of vendor service modules 116, a SKU map 120, a provisioning module 122, and a database 124. Each vendor service module 116 includes a userID map 118. Although shown implemented on the server 102, the vendor service modules 116 may be remotely located from the server 102 and/or from one another. The operating system 114 may include various commercially known operating systems.

The vendors 104 each include a vendorID 126, a plurality of vendor SKUs 128, and an order module 130. Each vendor service module 116 corresponds to a predetermined one of the vendors 104.

At the time when a person places an order with a vendor 104 for an item that will be made available by a provider, the vendor asks the person to either enter a userID previously established with that provider, or to concurrently register with and establish such a userID by providing a link to server 102 for the person to access. As part of the registration, the userID is placed in the userID map 130. Once a userID is established at the provider for that vendor's user, that registration information is used by server 102 to maintain userID map 118, which maps the userID as used by the vendor to the userID as used by the server 102, for a given registration. The vendor's order module 130 then sends the order to the server 102. The order includes the vendorID 126, the vendor SKU 128 for the ordered item, and a fulfillment identification, hereafter referred to as a fulfillment userID, which is a userID that is used by the vendor 104 to identify the person placing the order. The order module 130 sends the order to the vendor service module 116 associated with the vendor 104.

The vendor service module 116 receives the order and uses the userID map 118 to convert the fulfillment userID used by the vendor 104 to a userID known by the server 102. The vendor service module 116 then uses the SKU map 120 to convert the vendor SKU 128 to a provider's SKU. Maintenance of SKU map 120 is an update procedure that can be handled by an automatic process, thereby saving engineering time and effort in the event a vendor changes its SKU schema. The vendor service module 116 then calls the provisioning module 122 to provision the order. The order may be a purchase, a subscription, an extension of a subscription or any order capable of being fulfilled on the server 102. Upon successful validation of the SKU and the userID, the provisioning module 122 stores the order information in the database 124 and generates a response regarding the success or failure of the order to the vendor service module 116, which then sends the response back to the vendor 104. Although provisioning module 122 is shown implemented on the server 102, the provisioning module 122 may be implemented remotely from the server 102.

Figure 2:
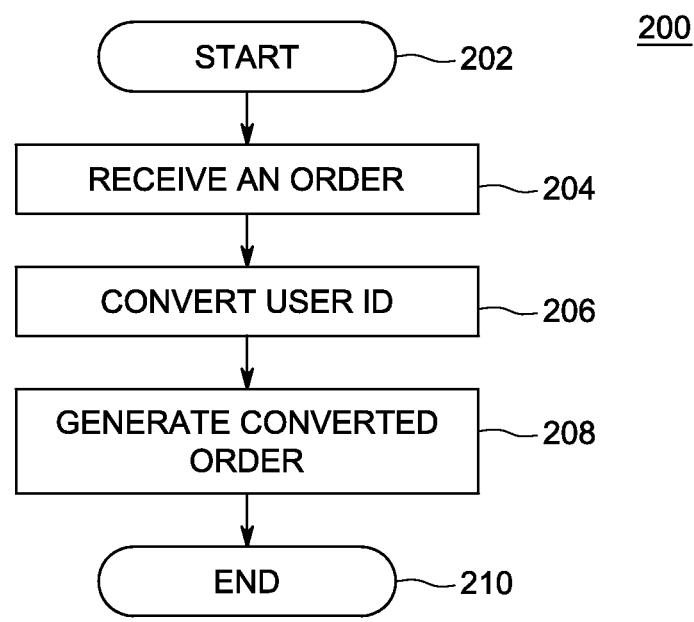
FIG. 2 depicts a flowchart of a method for receiving an order from a vendor as performed by the vendor service module of FIG. 1, according to one or more embodiments.

FIG. 2 depicts a flowchart of a method 200 for receiving an order from a vendor as performed by a vendor service module 116 of FIG. 1, according to one or more embodiments. The method 200 converts an order received from a vendor into an order that may be provisioned by the provisioning module 122. The method 200 starts at step 202 and proceeds to step 204.

At step 204, the method 200 receives an order from a vendor. Although the payment details are handled by the vendor, the order is provisioned by a provider. For example, the order may be a subscription to a software product on a cloud server, a purchase of additional storage on the cloud server, a software download, and the like, as non-limiting examples. The format of the order is dependent on the vendor because each vendor may use its own protocol. For example, APPLE® ITUNES® uses a receipt-based protocol, while AMAZON® uses its own Simple Notification Service (SNS) and Simple Queue Service (SQS) linking based communication protocol. Although the vendor protocols differ, irrespective of the vendor, each order received from a vendor includes at least a vendorID to identify the vendor, a vendor SKU used by the vendor to track inventory, and a fulfillment userID, which is a userID used by the vendor to identify the user who has placed the order. In some embodiments, the fulfillment userID is the same as a userID used by the provider.

The method 200 proceeds to step 206, where the method 200 converts the fulfillment userID of the vendor to a userID used by the provider. The method 200 accesses a userID map to convert the userID. In some embodiments, where the fulfillment userID is the same as the userID used by the provider, this step may be omitted.

The method 200 proceeds to step 208, where the method 200 generates a converted order that includes the vendorID, the converted userID, and the vendor SKU that may be sent to a provisioning module for provisioning.

The method 200 proceeds to step 210 and ends.

Figure 3:
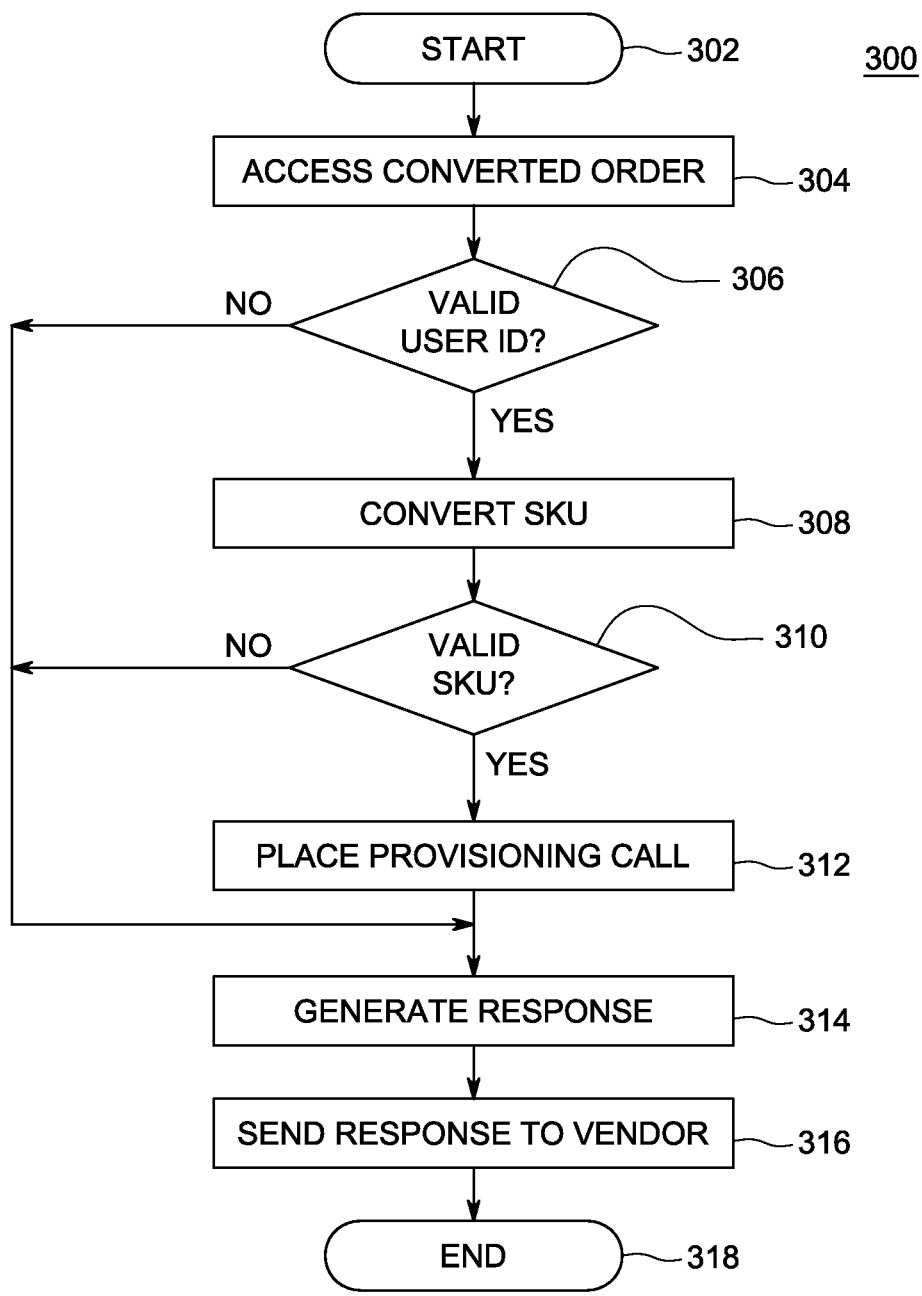
FIG. 3 depicts a flowchart of a method for provisioning an order as performed by the provisioning module of FIG. 1, according to one or more embodiments.

FIG. 3 depicts a flowchart of a method 300 for provisioning an order as performed by the provisioning module 122 of FIG. 1, according to one or more embodiments. The method 300 receives the converted order generated using method 200 above and provisions the order in a database.

The method 300 starts at step 302 and proceeds to step 304. At step 304, the method 300 accesses the converted order. The converted order includes a converted userID. The method 300 proceeds to step 306, where the method 300 validates the userID. The method 300 accesses a provider's database (previously used by the person who placed the order to establish a userID at the provider) to ensure that the userID provided in the converted order is valid. Once an order is provisioned, the userID is a key that is used to allow access to the software product, storage, or other purchased item. Therefore, the converted userID must match a userID in the provider's database. If the converted userID is not found in the database, the method 300 proceeds to step 314 where the method 300 generates a response regarding the invalidity of the userID. If the method 300 determines that the converted userID is valid, the method 300 proceeds to step 308.

At step 308, the method 300 converts the vendor SKU to a provider SKU. Although the present disclosure identified an item for purchase using a SKU, any type of vendor identifier for an item may be used and mapped to any corresponding type of provider identifier for an item. The method 300 accesses a SKU map. Each vendor SKU maps to a single provider SKU. The method 300 proceeds to step 310, where the method 300 validates the converted SKU. The SKU must match a SKU in the provider's database. The provider maintains the SKU map to ensure a vendor SKU is associated with a valid provider SKU. The converted SKU may be invalid if the SKU map was corrupted or if the provider SKU was modified and the SKU map was not updated. If the converted SKU is not found in the database, the method 300 proceeds to step 314 where the method 300 generates a response regarding the invalidity of the SKU. If the method 300 determines that the converted SKU is valid, the method 300 proceeds to step 312.

At step 312, the method 300 places a provisioning call to provision the order of that SKU for that userID. The order is provisioned as per the provider's requirements. For example, if the order is a SKU for a subscription to a product, the method 300 may store the subscription in the database 124 with the userID and any transaction terms associated with the subscription. If the order is an SKU for a subscription to a product, for example, and the userID already has a subscription to the product, the transaction term provided by method 300 may be to extend an expiry date of the subscription of the user. If the order is an SKU for access to storage on a cloud server, for example, the method 300 may store the access information in the database 124 with the userID and any terms associated with the order. In accordance with embodiments of the invention, regardless of which vendor originally received the order, the provisioning call to the provider is always of the same protocol or format.

The method 300 proceeds to step 314, where the method 300 generates a response regarding the provisioning of the order. The response may include the userID, the vendorID, the vendorSKU, a purchase receipt, a success/failure message, and the like. The success message many be error, subscription_created, subscription_extended, subscription_invalid, success, and the like. For example, the response may be as follows:

{userID, vendorID, vendorSKU, receipt, success/failure}

A specific response may be as follows:

{user123, vendorABC, 12345, receipt4444, subscription_created}

The method 300 proceeds to step 316, where the method 300 sends the response to the vendor where the order was placed. The method 300 proceeds to step 318 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving, at a server operated by a software provider over a network and from a first third-party vendor of a software product of the software provider, a first order initiated by a first user for the software product of the software provider, the first order having a first format;
extracting, from the first order by the server operated by the software provider, a first vendor identification comprising an identifier of the first third-party vendor, a first fulfillment user identification comprising a vendor-unique-user identifier (userID) for the first user, and a first vendor-specific product identifier comprising an identifier of the first order;
receiving, at the server operated by the software provider over the network and from a second third-party vendor of the software product of the software provider, a second order initiated by a second user for the software product of the software provider, the second order having a second format different from the first format;
extracting, from the second order by the server operated by the software provider, a second vendor identification comprising an identifier of the second third-party vendor, a second fulfillment user identification comprising a vendor-unique userID for the second user, and a second vendor-specific product identifier comprising an identifier of the second order;
converting, by the server operated by the software provider, the first order to a uniform format, wherein converting the first order comprises mapping the first fulfillment user identification extracted by the server operated by the software provider to credentials of the first user for remotely accessing one or more software products from the software provider previously received by the software provider from the first user and mapping the first vendor-specific product identifier to a first provider-specific product identifier;
generating, by the server operated by the software provider, a first provisioning call for the first order based on the converted first order in the uniform format;
provisioning, by the server operated by the software provider, the software product corresponding to the first provider-specific product identifier for the first user in a database of the server by providing access to the software product to a first client device of the first user upon verifying the credentials of the first user from the converted first order;
converting, by the server operated by the software provider, the second order to the uniform format, wherein converting the second order comprises mapping the second fulfillment user identification extracted by the server operated by the software provider to credentials of the second user for remotely accessing one or more software products from the software provider previously received by the software provider from the second user and mapping the second vendor-specific product identifier to a second provider-specific product identifier;
generating, by the server operated by the software provider, a second provisioning call for the second order based on the converted second order in the uniform format; and
provisioning, by the server operated by the software provider, the software product corresponding to second provider-specific product identifier for the second user in the database of the server by providing access to the software product to a second client device of the second user upon verifying the credentials of the second user from the converted second order.

2. The method of claim 1, further comprising generating a response regarding the success or failure of the first provisioning call and sending the response to the first third-party vendor.

3. The method of claim 1, wherein the credentials of the first user are unique to the software provider regardless of an identity of the first third-party vendor.

4. The method of claim 1, wherein:
the first provisioning call comprises the credentials of the first user and the first provider-specific product identifier; and
the second provisioning call comprises the credentials of the second user and the second provider-specific product identifier.

5. A system comprising:
a server operated by a software provider comprising at least one processor; and
at least one non-transitory computer readable storage medium storing instructions thereon that, when executed by the at least one processor, cause the system to:
receive, at the server operated by the software provider over a network and from a first third-party vendor of a software product of the software provider, a first order initiated by a first user for the software product of the software provider, the first order having a first format;
extract, from the first order by the server operated by the software provider, a first vendor identification comprising an identifier of the first third-party vendor, a first fulfillment user identification comprising a vendor-unique-user identifier (userID) for the first user, and a first vendor-specific product identifier comprising an identifier of the first order;
receive, at the server operated by the software provider over the network and from a second third-party vendor of the software product of the software provider, a second order initiated by a second user for the software product of the software provider, the second order having a second format different from the first format;
extract, from the second order by the server operated by the software provider, a second vendor identification comprising an identifier of the second third-party vendor, a second fulfillment user identification comprising a vendor-unique userID for the second user, and a second vendor-specific product identifier comprising an identifier of the second order;
convert the first order to a uniform format, wherein converting the first order comprises mapping the first fulfillment user identification extracted by the server operated by the software provider to credentials of the first user for remotely accessing one or more software products from the software provider previously received by the software provider from the first user and mapping the first vendor-specific product identifier to a first provider-specific product identifier;
generate a first provisioning call for the first order based on the converted first order in the uniform format;
provision the software product corresponding to the first provider-specific product identifier for the first user in a database of the server by providing access to the software product to a first client device of the first user upon verifying the credentials of the first user from the first converted order;
convert the second order to the uniform format, wherein converting the second order comprises mapping the second fulfillment user identification extracted by the server operated by the software provider to credentials of the second user for remotely accessing one or more software products from the software provider previously received by the software provider from the second user and mapping the second vendor-specific product identifier to a second provider-specific product identifier;
generate a second provisioning call for the second order based on the converted second order in the uniform format; and
provision the software product corresponding to the second provider-specific product identifier for the second user in the database of the server by providing access to the software product to a second client device of the second user upon verifying the credentials of the second user from the converted second order.

6. The system of claim 5, wherein the first fulfillment user identification is unique to the software provider regardless of an identity of the first third-party vendor.

7. The system of claim 5, wherein:
the first provisioning call comprises the credentials of the first user and the first provider-specific product identifier; and
the second provisioning call comprises the credentials of the second user and the second provider-specific product identifier.

8. A non-transitory computer readable medium comprising instructions thereon that, when executed by at least one processor, cause a computer system to:
receive, at a server operated by a software provider over a network and from a first third-party vendor of a software product of the software provider, a first order initiated by a first user for the software product of the software provider, the first order having a first format;
extract, from the first order by the server operated by the software provider, a first vendor identification comprising an identifier of the first third-party vendor, a first fulfillment user identification comprising a vendor-unique-user identifier (userID) for the first user, and a first vendor-specific product identifier comprising an identifier of the first order;
receive, at the server operated by the software provider over the network and from a second third-party vendor of the software product of the software provider, a second order initiated by a second user for the software product of the software provider, the second order having a second format different from the first format;
extract, from the second order by the server operated by the software provider, a second vendor identification comprising an identifier of the second third-party vendor, a second fulfillment user identification comprising a vendor-unique userID for the second user, and a second vendor-specific product identifier comprising an identifier of the second order;
convert the first order to a uniform format, wherein converting the first order comprises mapping the first fulfillment user identification extracted by the server operated by the software provider to credentials of the first user for remotely accessing one or more software products from the software provider previously received by the software provider from the first user and mapping the first vendor-specific product identifier to a first provider-specific product identifier;
generate a first provisioning call for the first order based on the converted first order in the uniform format;
provision the software product corresponding to the first provider-specific product identifier for the first user in a database of the server by providing access to the software product to a first client device of the first user upon verifying the credentials of the first user from the converted first order;

convert the second order to the uniform format, wherein converting the second order comprises mapping the second fulfillment user identification extracted by the server operated by the software provider to credentials of the second user for remotely accessing one or more software products from the software provider previously received by the software provider from the second user and mapping the second vendor-specific product identifier to a second provider-specific product identifier;

generate a second provisioning call for the second order based on the converted second order in the uniform format; and provision the software product corresponding to the second provider-specific product identifier for the second user in the database by providing access to the software product to a second client device of the second user upon verifying the credentials of the second user from the converted second order.

9. The non-transitory computer readable medium of claim 8, further comprising instructions that, when executed by the at least one processor, cause the computer system to:

validate the credentials of the first user and the first mapped provider-specific product identifier; and validate the credentials of the second user and the second mapped provider-specific product identifier.

10. The non-transitory computer readable medium of claim 8, further comprising instructions that, when executed by the at least one processor, cause the computer system to generate a response regarding the success or failure of the first provisioning call and send the response to the first third-party vendor.

11. The non-transitory computer readable medium of claim 8, wherein the credentials of the first user are unique to the software provider regardless of an identity of the first third-party vendor.

12. The method of claim 1, wherein receiving the first order comprises receiving, in conjunction with receiving the first order, a provider-specific identifier of the first user.

13. The method of claim 12, further comprising registering a user account for the first user with the software provider based on the received provider-specific identifier of the first user.

14. The method of claim 13, wherein mapping the first fulfillment user identifier extracted by the server operated by the software provider to the credentials of the first user comprises mapping the first fulfillment user identifier to the user account for the first user with the software provider.

15. The method of claim 12, wherein mapping the first fulfillment user identifier extracted by the server operated by the software provider to the credentials of the first user comprises mapping the first fulfillment user identifier to a previously registered user identifier (userID) that corresponds to the received provider-specific identifier of the first user.

16. The method of claim 1, wherein receiving the second order comprises receiving, in conjunction with receiving the second order, a provider-specific identifier of the second user, the method further comprising:

registering a user account for the second user with the software provider based on the received provider-specific identifier of the second user; and wherein mapping the second fulfillment user identifier extracted by the server operated by the software provider to the credentials of the second user comprises mapping the second fulfillment user identifier to the provider-specific identifier of the second user received in conjunction with receiving the second order.

17. The method of claim 1, wherein:

receiving the second order comprises receiving, in conjunction with receiving the second order, a provider-specific identifier of the second user; and wherein mapping the second fulfillment user identifier extracted by the server operated by the software provider to the credentials of the second user comprises mapping the second fulfillment user identifier to a previously registered userID that corresponds to the received provider-specific identifier of the second user.

18. The method of claim 1, wherein providing access to the software product to the first client device comprises one or more of providing access to the software product via a cloud server of the software provider or transferring the software product from the server operated by the software provider for storage on the first client device of the first user; and wherein providing access to the software product to the second client device comprises one or more of providing access to the software product via a cloud server of the software provider or transferring the software product from the server operated by the software provider for storage on the second client device of the second user.

19. The system of claim 5, further comprising instructions that, when executed by the at least one processor, cause the system to:

provide access to the software product to the first client device by one or more of providing access to the software product via a cloud server of the software provider or transferring the software product from the server operated by the software provider for storage on the first client device of the first user; and provide access to the software product to the second client device by one or more of providing access to the software product via a cloud server of the software provider or transferring the software product from the server operated by the software provider for storage on the second client device of the second user.

20. The non-transitory computer readable medium of claim 8, further comprising instructions that, when executed by the at least one processor, cause the computer system to:

provide access to the software product to the first client device by one or more of providing access to the software product via a cloud server of the software provider or transferring the software product from the server operated by the software provider for storage on the first client device of the first user; and provide access to the software product to the second client device by one or more of providing access to the software product via a cloud server of the software provider or transferring the software product from the server operated by the software provider for storage on the second client device of the second user.

* * * * *